(No Model.)
J. M. DE WITT.
CAR CHECK.
No. 404,901. Patented June 11, 1889.
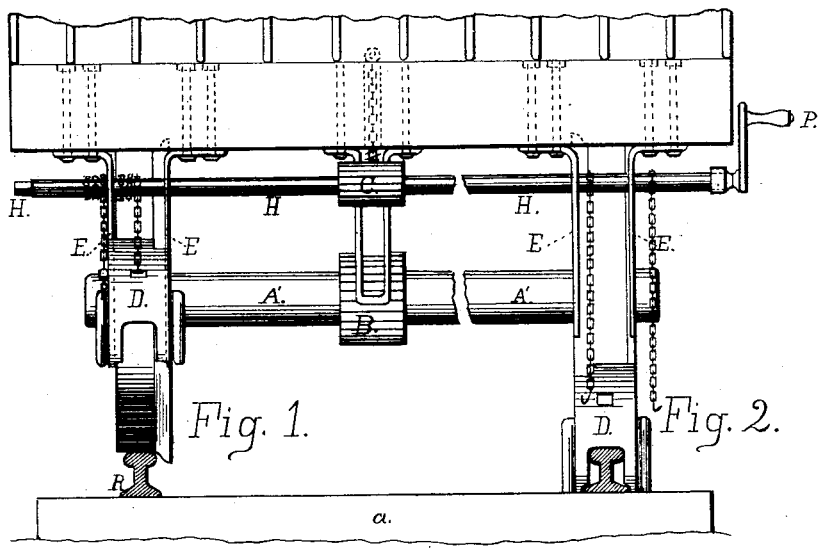
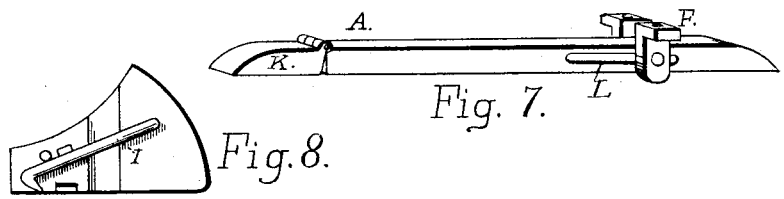
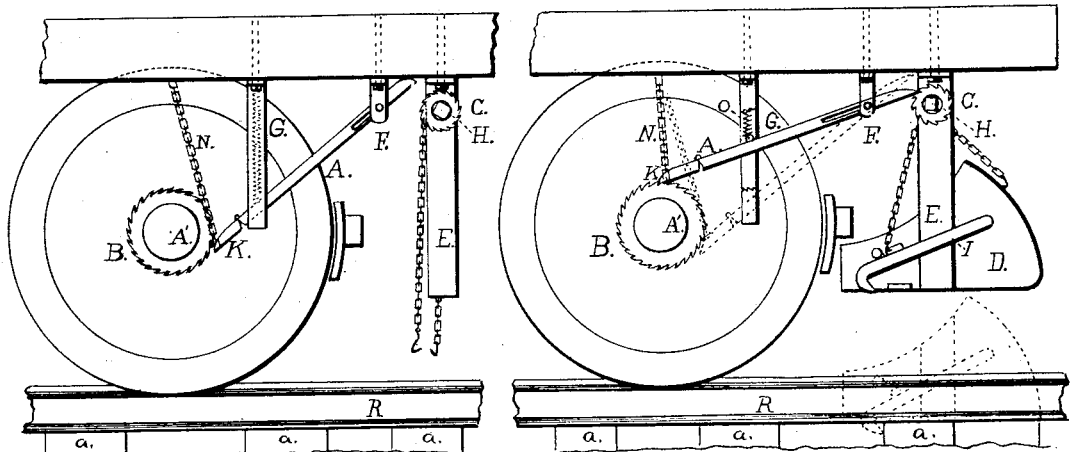
WITNESSES:
John J. Graham
W. H. Morgan
INVENTOR
James M. De Witt

UNITED STATES PATENT OFFICE.

JAMES M. DE WITT, OF RUTHERFORD, NEW JERSEY.

CAR-CHECK.

SPECIFICATION forming part of Letters Patent No. 404,901, dated June 11, 1889.

Application filed March 1, 1889. Serial No. 301,722. (No model.)

*To all whom it may concern:*

Be it known that I, JAMES M. DE WITT, of Rutherford, county of Bergen, State of New Jersey, have invented a new and useful Improvement in Car-Checks, of which the following is a specification.

This invention is an improvement on my car-check patented June 17, 1884, Serial No. 300,448.

My improvement relates to an improved means for operating my car-check on railway-trains while in motion, and while ascending grades, and when part of the train accidentally becomes detached. My improved means for operating my car-check arrests the backward movement of the detached cars at once.

Reference is to be had to the accompanying drawings, forming part of this specification, in which similar letters of reference indicate corresponding parts in all the figures.

Figure 1 is an end view of a car having my car-check in position ready for use. Fig. 2 shows check dropped on rail in position to check detached cars. Fig. 3 is a side view of a car with my improvement attached and pawl dropped after coming in contact with the ratchet-wheel on the axle. Fig. 4 is a side view of my improvement with check attached. Fig. 5 is an end view of a guide to hold the pawl in place over ratchet-wheel, also to prevent the pawl from dropping down too far. In the guide is shown a spring fastened at one end to the pawl and the other end to top of guide G. Fig. 6 shows a device for holding the pawl to the car. Fig. 7 is an enlarged view of the pawl with a device for holding it to the car attached. Fig. 8 is a side view of my patented car-check with grooves in the sides.

A' represents the car-axle.

B is a ratchet-wheel fastened to axle A'; E E, guides for holding check D in position over rail R, and consists of two pieces of iron bent at one end and fastened to bottom of car, so as to fit into a groove on each side of check D, thus preventing check D from moving forward, backward, or sidewise.

A is an iron pawl with a slot L in it near one end, and having a hinged part K at the other end. (See Fig. 7.) This pawl is held in position under car by the bolt M (see Fig. 6) passing through slot L and F F, F F being bolted to car. One end of pawl A coming in contact with the teeth of ratchet-wheel C, and pressing against end of slot L, holds the rod H from turning, thereby holding check D in position over rail R. The other end of pawl A at hinged part K gently lies on ratchet-wheel B, (see Fig. 4,) so in case the car moves backward the hinged part K of pawl A will come in contact with the teeth of ratchet-wheel B, and force the other end of pawl A free from ratchet-wheel C, and cause check D to drop on rail R.

H is an iron rod running full width of car, with chains attached to hold check D over rail R, and has a ratchet-wheel C attached. The ends of rod H are square at both ends, so as to permit crank P being placed on either end. The rod H is held in position by passing through the guides E E.

G is a guide to hold end of pawl A in position and prevents its dropping too far after coming in contact with the teeth of ratchet-wheel B. It also has a spring O, with one end fastened to top of guide and the other end to pawl A. This spring holds the extra weight of pawl A forward of bolt M from disengaging it from ratchet-wheel C by any jarring of the car, and also holds end of pawl A against teeth of ratchet C when rod H is being turned by crank P, unless the end of pawl A at hinged part K comes in contact with the teeth of ratchet-wheel B on axle A'. Attached to hinged part K of pawl A is a chain N, running up into car, so when it is desired to move the train backward the hinged part K of pawl A can be raised so as to clear the teeth of ratchet-wheel B.

Having thus described my invention, what I claim as new, and desire to secure by Letters Patent, is—

The combination of the hinged pawl A with the ratchet-wheel B on axle A and the ratchet-wheel C on rod H, the latter being provided with a check-elevating chain, all substantially as described.

JAMES M. DE WITT.

Witnesses:
JOHN J. GRAHAM,
W. H. MORGAN.